United States Patent
Wu

(10) Patent No.: US 10,503,554 B2
(45) Date of Patent: Dec. 10, 2019

(54) SYSTEM, METHOD AND COMPUTER READABLE MEDIA STORAGE PROGRAM THEREIN FOR ALLOCATING CLOUD RESOURCE

(71) Applicants: Inventec Appliances Corp., New Taipei (TW); Inventec Appliances (Pudong) Corp, Shanghai (CN)

(72) Inventor: Hsin-Hsueh Wu, Taipei (TW)

(73) Assignees: Inventec Appliances Corp., New Taipei (TW); Inventec Appliances (Pudong) Corp., Shanghai (CN)

( * ) Notice: Subject to any disclaimer, the term of this patent is extended or adjusted under 35 U.S.C. 154(b) by 381 days.

(21) Appl. No.: 14/516,048

(22) Filed: Oct. 16, 2014

(65) Prior Publication Data

US 2015/0333978 A1  Nov. 19, 2015

(30) Foreign Application Priority Data

May 19, 2014  (CN) .......................... 2014 1 0211346

(51) Int. Cl.
*H04L 29/06* (2006.01)
*G06F 9/50* (2006.01)
*H04L 12/24* (2006.01)
*H04L 29/08* (2006.01)

(52) U.S. Cl.
CPC ........ *G06F 9/5027* (2013.01); *H04L 41/5054* (2013.01); *H04L 67/10* (2013.01); *G06F 2209/501* (2013.01)

(58) Field of Classification Search
CPC .......................... H04L 67/10; H04L 41/5054
USPC ......................................................... 709/226
See application file for complete search history.

(56) References Cited

U.S. PATENT DOCUMENTS

2013/0218840 A1* 8/2013 Smith ................. G06F 11/1446
707/639

* cited by examiner

*Primary Examiner* — Adnan M Mirza
(74) *Attorney, Agent, or Firm* — Foster Garvey PC

(57) ABSTRACT

The present invention discloses a system, method and computer readable media storage program therein for allocating cloud resources, which is adapted to obtain and allocate work demand to a proper cloud resource for the processing thereof. The method, system and the computer readable media comprise the steps and corresponding device needed to classify and arrange the order of the cloud data, obtaining work demand and matching the work demand with the cloud resource so as to process thereto.

9 Claims, 4 Drawing Sheets

SYSTEM, METHOD AND COMPUTER READABLE MEDIA STORAGE PROGRAM THEREIN FOR ALLOCATING CLOUD RESOURCE

PRIORITY CLAIM

This application claims the benefit of the filing date of China Patent Application No. 201410211346.6, filed May 19, 2014, entitled "SYSTEM, METHOD AND COMPUTER READABLE MEDIA STORAGE PROGRAM THEREIN FOR ALLOCATING CLOUD RESOURCE," and the contents of which are hereby incorporated by reference in their entirety.

FIELD OF THE INVENTION

The present invention provides a system, method and computer readable media storage program therein for allocating cloud resources, and more particularly, the present invention provides a system, method and computer readable media storage program therein for allocating cloud resources, which is adapted to obtain/receive and allocate work demand to a proper cloud resource for the processing thereof.

BACKGROUND

Cloud computing is a computing method that utilizes the Internet as its primary source for storage. Using this method, the software and hardware resource and messages that are able to be shared can be shared to computers and other devices according to the necessary requirements for connecting to the cloud. Users access the cloud service through browsers, desktop application programs or mobile application programs. Promoters believe that cloud computing allows enterprises to dispose application programs more rapidly, which reduces the complexity of management and maintenance cost, and rearranges the IT resource rapidly in order to meet the rapid requirement changes of the enterprises.

Cloud storage is a network online storage mode, which means that storing data in a plurality of virtual servers is usually managed by a third party, rather than a dedicated server. The third party operates a huge data center. People who want to store data buy or rent storage space from the third party in accordance with their requirement. According to the requirements of the customers, the company that operates the data center prepares the resources of storage virtualization needed in the back end, and supplies the resource of storage virtualization through the storage resource pool method so that the customers store files in the storage resource pool themselves. In fact, the resources may be allocated in a numerous servers.

Cloud storage works through a Web service application programming interface or a Web user interface. With the development of cloud computing and cloud storage, there are various cloud resources available for users. For example, DROPBOX, GOOGLE DRIVE or any other remote computing workstation that is set up by the user them self. However, different types of cloud resources have different properties, such as storage capacity, operating speed, upload speed limit, download speed limit, upload quantity limit, or download quantity limit. The statements mentioned above the prior art of the cloud resource industry.

SUMMARY OF THE INVENTION

The present invention provides a mechanism which is able to automatically obtain/receive and allocate work to a proper cloud resource for the processing thereof. Therefore, the load of the cloud resource can be balanced and the cloud resource will be used more effectively. More particularly, the inventor found that with the recent development of cloud technology, many various cloud resources have become available. Though each cloud resource have different properties and class, which makes selecting a proper cloud resource that executes the corresponding work perplexing to the user.

In order to solve the problems mentioned above, the inventor provides a solution, which involves first classifying the cloud resource according to the class of the platform (for example, the platform being used for computing or storing), and sorting the property and the load degree of the cloud resource. When the work is generated and has a specific property demand, the present invention will automatically allocate the work to a proper cloud resource in order to process according to the property of the work. For example, when the work is storing a file which requires a large amount of storage space, the present invention will analyze the available storage capacity, the network transmission flow, and the flow rate of each cloud resource in order to identify the best selection, and then setting the best selection as a predetermined cloud resource, and transmitting the file to the cloud resource to be processed.

That is to say, the present invention classifies the cloud resource according to the class of the platform first. The class of the platform can be classified through functions. For example, when using the storing function and the cloud computing function, and then sorting according to each cloud resource property (such as the size of the storage space, reaction rate, flow rate limitation, and flow amount limitation) and loading. Then, when the work/demand is generated, allocating to the predetermined cloud resource to process according to the demand and service that is required by the work/demand, and then sorting each cloud resource property and loading again, and waiting for the next work generated for being allocated. When the work on the cloud resource is completed, the present invention will also resort each cloud resource property and loading again. The statement mentioned above is one of a plurality of embodiments that exemplify the major spirits of the present invention.

Therefore, using the mechanisms of the present invention, the goal of automatic allocation of the cloud can be achieved, while the work can also be allocated according to the functional property of the demand of the work, which also allows the load of each cloud resource to be balanced, and thus the cloud resource is allowed to be used effectively as well.

The advantages and spirits of the invention may be understood by the following recitations together with the appended drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
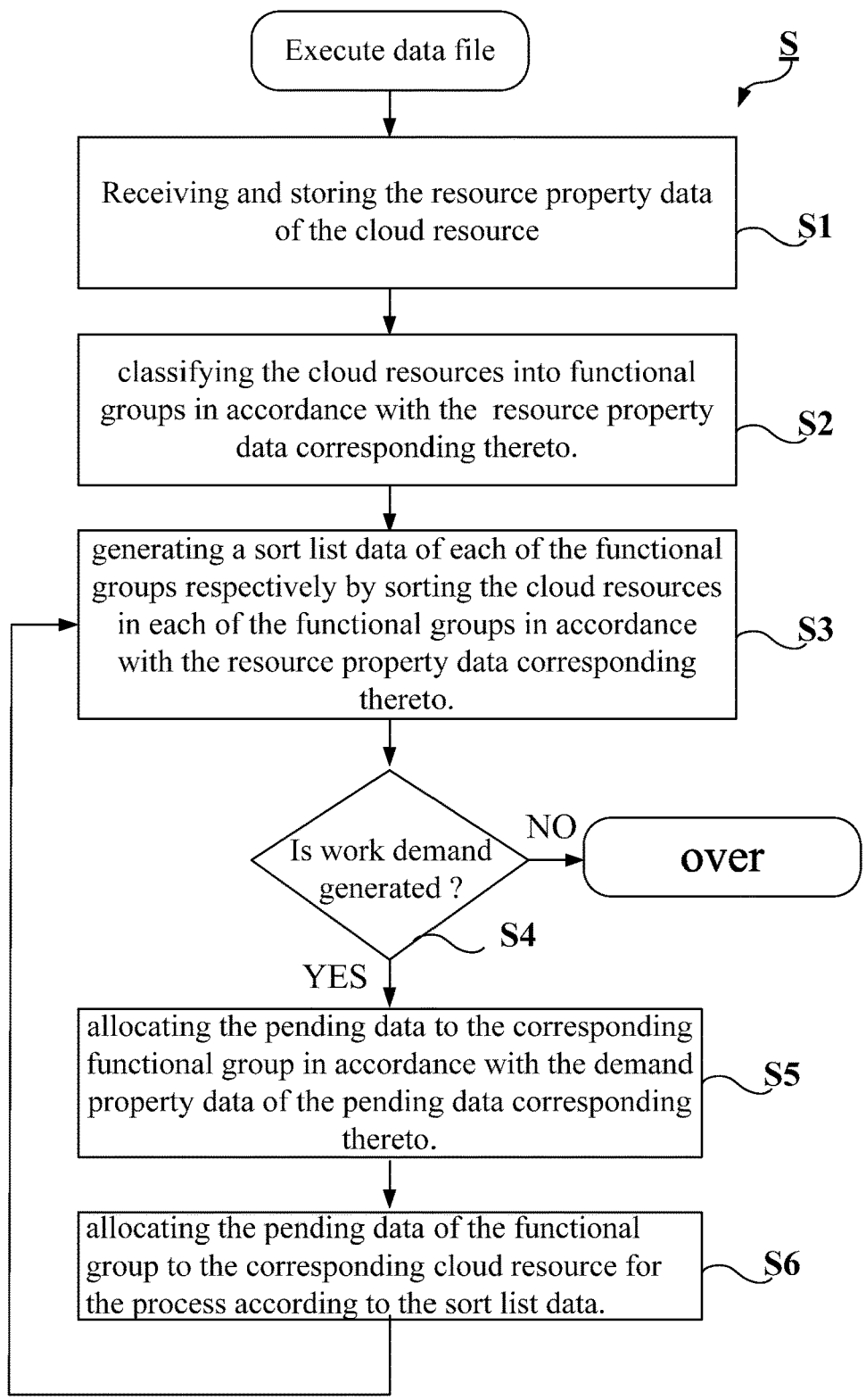
FIG. 1 shows the flow chart of a method for allocating cloud resources in an embodiment of the present invention.

According to the statement mentioned above, the present invention is a system, method and computer readable media storage program therein that allocates cloud resources. Please refer to FIG. 1. FIG. 1 shows the flow chart of a method for allocating cloud resources in an embodiment of the present invention. As shown in FIG. 1, the method of the present invention comprises step 1 to step 6.

In step 1, the destination automatically receives a plurality of resource property data corresponding to a plurality of cloud resources according to a predetermined list respectively. More particularly, the predetermined list mentioned above can comprise a list of available cloud resources, Internet positions (IP), names, or any other data that is able to be connected with the cloud resources to be accessed, such as using the account or password of the user. Additionally, the predetermined list mentioned above is not limited to being manually saved in advance by the user as the predetermined list mentioned above can be downloaded online as well. The resource property data mentioned above comprises a resource class data and a resource amount data. The resource class data corresponds to the major function provided by the cloud resource. The major function comprises a data storage function, a data computing function, or any other function.

In another aspect of the present invention, the resource amount data comprises at least one selected from a group comprising work load, reaction rate, storage capacity, flow rate limitation or flow amount limitation. The work load can be the utilized degree or an unutilized degree of the computational ability of the cloud resource. The reaction rate can be the reaction time difference of the network connection between the hardware and the cloud resource, the round-trip time of the package, or the PING value of the method of the present invention. The storage capacity can be the available space for the storage of the cloud resource. Generally, the counting unit for measuring the storage spaces is GB (Gigabyte). The flow rate limitation is the limit of the network transmission rate of the hardware that is preset by the cloud resource, which is usually counted in KB/s. The flow amount limitation is the allowed limit of the network transmission amount in a predetermined time interval of the hardware, which is preset by the cloud resource, where the limitation is usually counted by GB/D.

After receiving the list of each cloud resource and the corresponding resource property data, step 2 will then be performed. The objective of step 2 is to classify the cloud resources in order to distinguish the types of cloud resources. More particularly, step 2 is classifying the plurality of cloud resources into a plurality of functional groups in accordance with the plurality of resource property data corresponding thereto, wherein each of the functional groups has a major function respectively. More particularly, when a resource class data of the cloud resource is data to-be-stored, the cloud resource will be classified into the functional group that is used for primarily for data storing. When the resource class data of the cloud resource is data to-be-computed, the cloud resource will be classified into the functional group that is used primarily for data computing.

After that, step 3 will be performed. The objective of step 3 is to generate a sort list data of each of the functional groups respectively by sorting the plurality of cloud resources in each of the functional groups in accordance with the resource property data corresponding thereto, which means that each functional group corresponds to a sort list data respectively, and each sort list data corresponds to the resource property data of each functional group.

Next, step 4 will be performed. The objective of step 4 is to automatically receive a pending data from a data source that corresponds to a work demand. The pending data comprises a demand property data. If the pending data cannot be received, the procedure is terminated and then the process returns to step 1. More particularly, the data source mentioned above is a memory, a hardware, or a network database which is set inside/outside or online/offline of the database of the element/device. The pending data can be a file that is waiting to be stored or computed. The demand property data can comprise of at least one selected from the group comprising a demand class data and a demand amount data. The demand class data can comprise data that is to-be-stored or data that is to-be-computed for instance. The demand amount data can comprise file size or computational demand. The computational demand can indicate the amount of the needed computer resource.

After that, step 5 will be performed. The objective of step 5 is to respectively allocate the pending data to the corresponding functional group in accordance with the demand property data of the pending data corresponding thereto. More particularly, the destination classifies the pending data and assigns the pending data to a corresponding functional group. Additionally, the pending data is respectively assigned to a corresponding functional group for the following process respectively according to the demand property data of the plurality of pending data. For example, if the pending data is a big sized file that is waiting to be stored, then the pending data is going to be assigned to a functional group which has larger data storage capacity. However, if the demand is focused on rapid temporary storage, then the pending data will be assigned to a functional group which has better data computational ability.

Then, step 6 will be performed. The objective of step 6 is to allocate the pending data of the functional group to the corresponding cloud resource for the process of the corresponding major function according to the sort list data. The process of the major function mentioned above indicates the actions of storage and computation. Upon step 6 being completed, the process will return to step 3 to rearrange and receive another pending data for the follow-up process. It is worth noting that the steps of the method mentioned above can be performed through program/procedure, logic circuit of single chip, or any other method.

Figure 2:
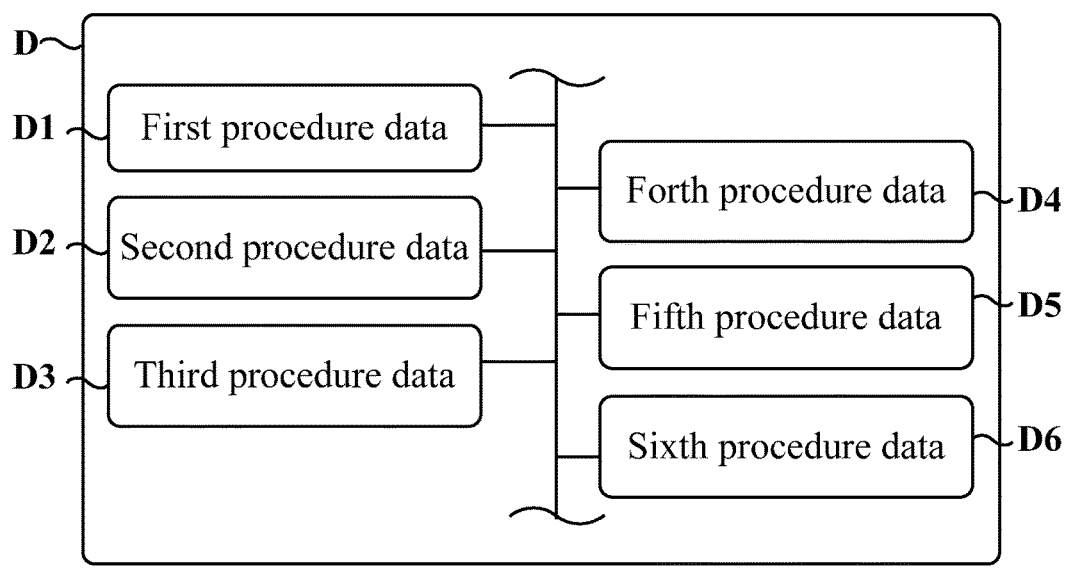
FIG. 2 shows the function block diagram of the computer-readable media storage program in an embodiment of the present invention.

For example, please refer to FIG. 2. FIG. 2 shows the function block diagram of the computer-readable media storage program in an embodiment of the present invention. As shown in FIG. 2, the computer-readable media storage program D of the present invention comprises a first procedure data D1 to sixth procedure data D6, wherein the first procedure data D1 to the sixth procedure data D6 respectively correspond to step 1 to step 6. Every procedure data mentioned above can be integrated into a data file and stored in a computer-readable media to then act as the computer-readable media storage program D of the present invention. The computer-readable media mentioned above is primarily a hard disk drive, a disk, or any other medium that is able to record codes.

Figure 3:
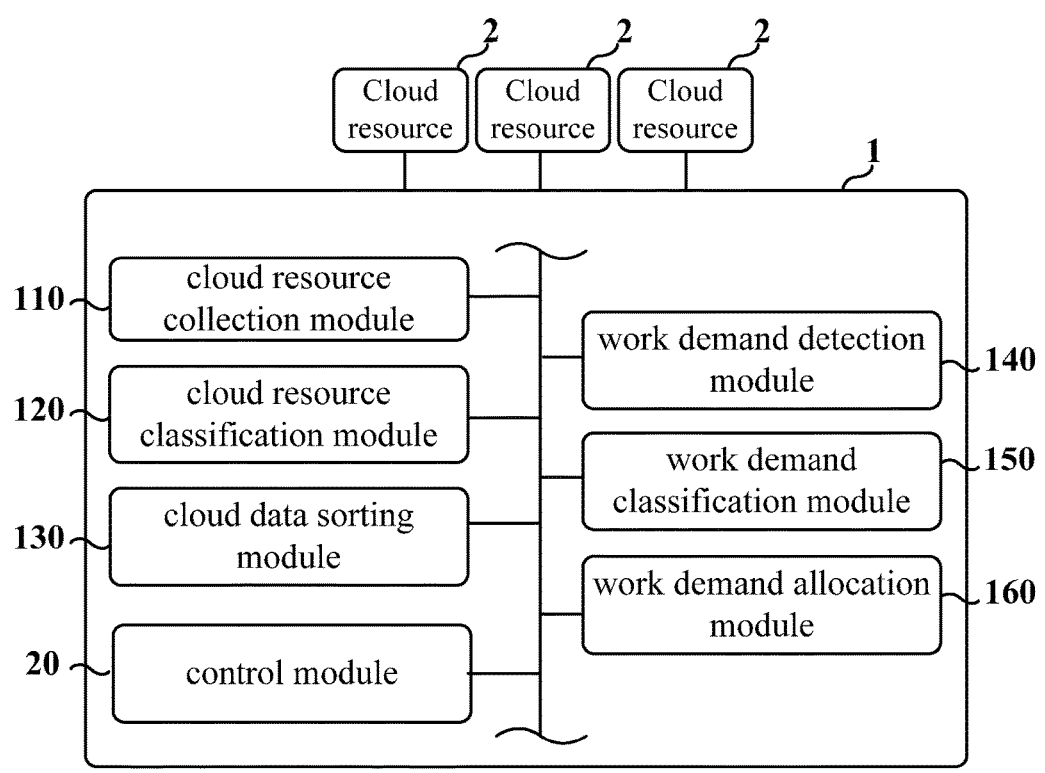
FIG. 3 shows the function block diagram of the cloud resource allocation system in an embodiment of the present invention.

Please refer to FIG. 3. FIG. 3 shows the function block diagram of the cloud resource allocation system in an embodiment of the present invention. As shown in FIG. 3, in this embodiment, the cloud resource allocation system 1 comprises a cloud resource collection module 110, a cloud resource classification module 120, a cloud data sorting module 130, a work demand detection module 140, a work demand classification module 150, and a work demand allocation module 160.

The cloud resource collection module 110 is adapted to receive a plurality of resource property data corresponding to a plurality of cloud resources according to a predetermined list. The cloud resource classification module 120 is adapted to classify the plurality of cloud resources into a plurality of functional groups in accordance with the plurality of resource property data of the cloud resources corresponding thereto, wherein each functional group has at least one major function. The cloud data sorting module 130 is adapted to generate a sort list data of each of the functional groups respectively by sorting the plurality of cloud resources in each of the functional groups in accordance with the resource property data corresponding thereto. The work demand detection module 140 is adapted to receive a pending data from a data source, wherein the pending data comprises a demand property data. The work demand classification module 150 is then adapted to allocate the pending data to the corresponding functional group in accordance with the demand property data corresponding thereto. The work demand allocation module 160 is adapted to allocate the pending data to one of the plurality of cloud resources in the corresponding functional groups in accordance with the demand property data and/or the sort list data so as to process the pending data.

In another aspect of the present invention, the function of the cloud resource collection module 110 mentioned above can correspond to step 1, where the function of the cloud resource classification module 120 mentioned above can correspond to step 2. The function of the cloud data sorting module 130 mentioned above can correspond to step 3, where the function of the work demand detection module 140 mentioned above can correspond to step 4. The function of the work demand classification module 150 mentioned above can correspond to step 5, where the function of the work demand allocation module 160 mentioned above can correspond to step 6. Every module mentioned above can be coupled with each other. Each cloud resource 2 can also be coupled to the present invention using the Internet for application.

According to the statement mentioned above, the cloud resource allocation system 1 of the present invention can further comprise a control module 20. The control module 20 is coupled to the modules previously described and adapted to control the operation thereof. In this embodiment, the control module 20 can be a central processing unit which also acts as the corresponding driving program or interface program. The control module 20 can also be a remote server which has computational ability, which is not limited by the present invention. The entire cloud resource allocation system 1 can be a combination of personal computers and servers.

Figure 4:
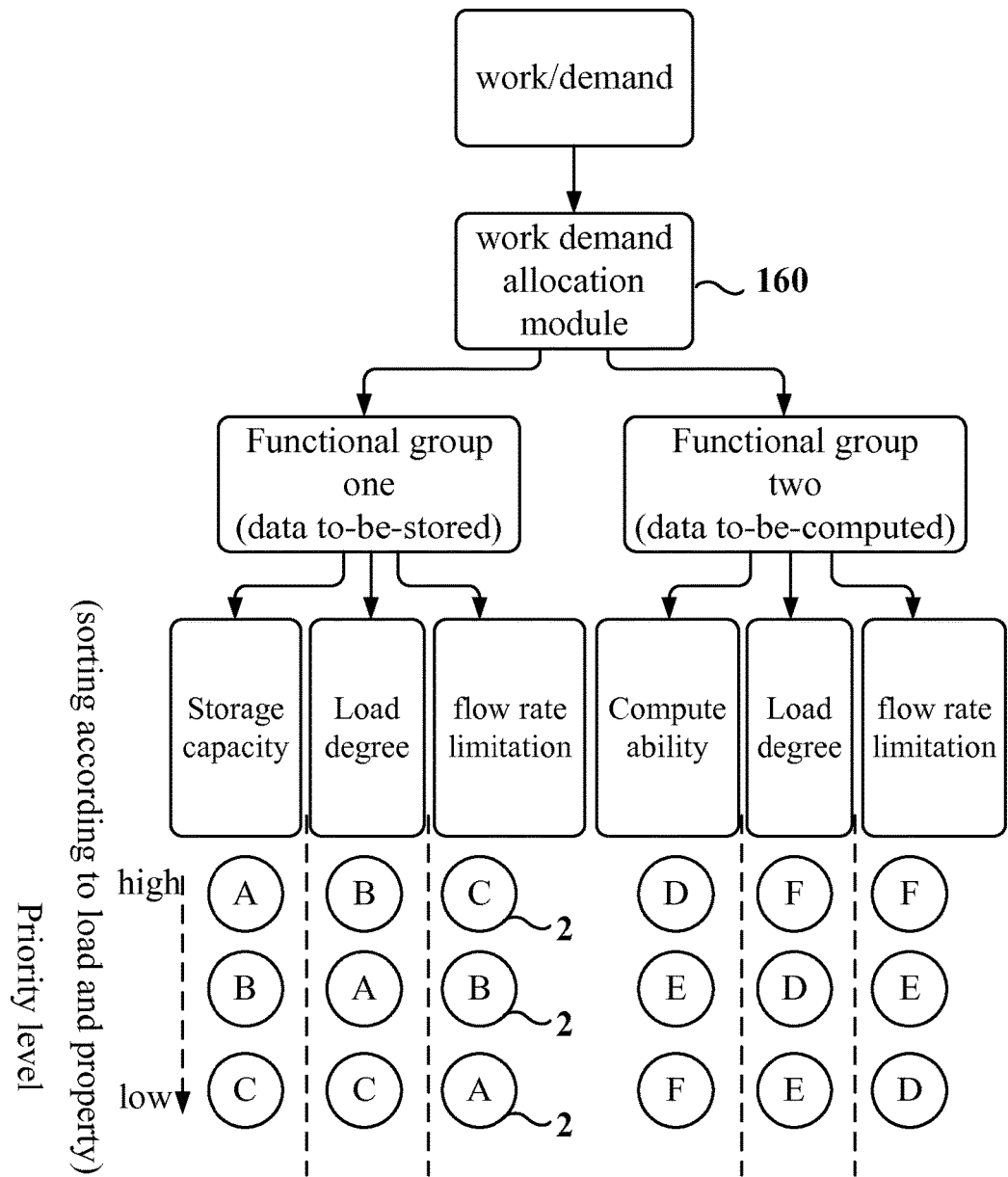
FIG. 4 shows the flow chart of a work demand allocation module of the cloud resource allocation system in an embodiment of the present invention.

In addition, please refer to FIG. 4. FIG. 4 shows the flow chart of a work demand allocation module of the cloud resource allocation system in an embodiment of the present invention. As shown in FIG. 4, in this embodiment, the present invention comprises six cloud resources 2, which are A, B, C, D, E, and F, and are classified into one or two functional groups according to the function of the platform, wherein A to C have the same function, so A to C are classified into functional group one; and D to F are classified into functional group two. Then the cloud resources are sorted according to each cloud resource property and loading property. For example, if the primary consideration of the cloud resource property is storage capacity, the sequence of the assigned work is A, B, C. If the primary consideration of the cloud resource property is to equalize the loading of each cloud resource, then the free resource is priority. So in this embodiment, the sequence of the assigned work is B, A, C. If the primary consideration of the cloud resource property is the flow rate limitation, the sequence of the assigned work is C, B, A. Therefore, the sort list data mentioned above is generated and the allocation method of the cloud resource D, E, F is similar with the statement mentioned above.

Therefore, using the mechanism of the present invention, the cloud can be allocated automatically, work can be assigned according to the demand property of the work demand, the load of cloud resource is allowed to be balanced, and cloud resourced are used more efficiently.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for allocating cloud resources, comprising the following steps of:
   receiving a plurality of resource property data corresponding to a plurality of cloud resources;
   classifying the plurality of cloud resources into a plurality of functional groups in accordance with each resource property data corresponding to the cloud resource respectively, wherein each of the functional groups has a major function respectively, and the major function comprises a data storage function or a data computation function;
   generating a sort list data of each of the functional groups respectively by sorting and ranking the plurality of cloud resources in each of the functional groups in accordance with the resource property data corresponding thereto;
   receiving a pending data, the pending data comprising a demand property data;
   allocating the pending data to the corresponding functional group in accordance with the demand property data corresponding thereto; and
   allocating the pending data to one of the plurality of cloud resources in the corresponding functional group according to the demand property data related to the sort list data of the corresponding functional group so as to process the pending data;

wherein the sort list data will be updated after the pending data is allocated or completely processed; wherein the resource property data comprises a resource class data and a resource amount data, the resource class data corresponds to the major function provided by the cloud resource, and the resource amount data comprises at least one of the following selected from a group comprising of work loading, reaction rate, storage capacity, flow rate limitation or flow amount limitation.

2. The method of claim 1, wherein the sort list data is corresponding to a priority of the plurality of cloud resources in the functional group.

3. The method of claim 1, wherein the demand property data comprises a demand class data and a demand amount data; the demand class data comprises data to-be-stored or data to-be-computed, and the demand amount data comprises at least one file size or computational demand.

4. A method for allocating cloud resources, comprising the following steps of:
receiving a plurality of resource property data corresponding to a plurality of cloud resources;
classifying the plurality of cloud resources into a plurality of functional groups in accordance with each resource property data corresponding to the cloud resource respectively, wherein each of the functional groups has a major function respectively, and the major function comprises a data storage function or a data computation function;
generating a sort list data of each of the functional groups respectively by sorting and ranking the plurality of cloud resources in each of the functional groups in accordance with the resource property data corresponding thereto;
determining if a pending data exists, if it exists, then receiving a pending data, the pending data comprising a demand property data;
allocating the pending data to the corresponding functional group in accordance with the demand property data corresponding thereto; and
allocating the pending data to one of the plurality of cloud resources in the corresponding functional group according to the demand property data related to the sort list data of the corresponding functional group so as to process the pending data;
wherein the sort list data will be updated after the pending data is allocated or completely processed; wherein the resource property data comprises a resource class data and a resource amount data, the resource class data corresponds to the major function provided by the cloud resource, and the resource amount data comprises at least one of the following selected from a group comprising of work loading, reaction rate, storage capacity, flow rate limitation or flow amount limitation.

5. The method of claim 4, wherein the sort list data is corresponding to a priority of the plurality of cloud resources in the functional group.

6. The method of claim 4, wherein the demand property data comprises a demand class data and a demand amount data, the demand class data comprises data to-be-stored or data to-be-computed, and the demand amount data comprises at least one file size or computational demand.

7. A cloud resource allocation system, comprising:
a cloud resource collection module, adapted to receive a plurality of resource property data corresponding to a plurality of cloud resources;
a cloud resource classification module, adapted to classify the plurality of cloud resources into a plurality of functional groups in accordance with each resource property data corresponding to the cloud resource respectively, wherein each of the functional groups has a major function respectively, and the major function comprises a data storage function or a data computation function;
a cloud data sorting module, adapted to generate a sort list data of each of the functional groups respectively by sorting and ranking the plurality of cloud resources in each of the functional groups in accordance with the resource property data corresponding thereto;
a work demand detection module, adapted to receive a pending data, the pending data comprising a demand property data;
a work demand classification module, adapted to allocate the pending data to the corresponding functional group in accordance with the demand property data corresponding thereto;
a work demand allocation module, adapted to allocate the pending data to one of the plurality of cloud resources in the corresponding functional group according to the demand property data related to the sort list data of the corresponding functional group so as to process the pending data; and
a control module, coupled to the modules previously described, the control module adapted to control the operation thereof;
wherein the sort list data will be updated after the pending data is allocated or completely processed; wherein the resource property data comprises a resource class data and a resource amount data, the resource class data corresponds to the major function provided by the cloud resource, and the resource amount data comprises at least one of the following selected from a group comprising of work loading, reaction rate, storage capacity, flow rate limitation or flow amount limitation.

8. The system of claim 7, wherein the sort list data is corresponding to a priority of the plurality of cloud resources in the functional group.

9. The system of claim 7, wherein the demand property data comprises a demand class data and a demand amount data, the demand class data comprises data to-be-stored or data to-be-computed, and the demand amount data comprises at least one file size or computational demand.

* * * * *